United States Patent [19]
Whiting et al.

[11] 3,905,085
[45] Sept. 16, 1975

[54] METHOD OF SECURING A FRONT HINGE TO AN EYEGLASS FRAME FRONT

[75] Inventors: Harold F. Whiting, Attleboro; Herbert P. Nelson, North Attleboro, both of Mass.

[73] Assignee: The Hilsinger Corporation, Plainville, Mass.

[22] Filed: May 14, 1974

[21] Appl. No.: 469,818

Related U.S. Application Data

[60] Division of Ser. No. 375,385, July 2, 1973, which is a continuation-in-part of Ser. No. 171,679, Aug. 13, 1971, abandoned.

[52] U.S. Cl. ............... 29/418; 16/128 A; 29/190; 29/445; 351/153
[51] Int. Cl.² ......................................... B23P 17/00
[58] Field of Search ............ 29/418, 464, 526, 445, 29/190; 351/98, 102, 153; 16/128 A

[56] References Cited
UNITED STATES PATENTS

| | | |
|---|---|---|
| 1,329,827 | 2/1920 | Crittall .................................. 29/445 |
| 1,335,318 | 3/1920 | Day ..................................... 351/102 |
| 1,471,952 | 10/1923 | Ford ..................................... 29/445 |
| 2,587,870 | 3/1952 | Marsters ..................... 16/128 A UX |
| 2,727,436 | 12/1955 | Prince ................................... 351/98 |
| 3,052,966 | 9/1962 | Cronan .............................. 29/418 X |
| 3,111,859 | 11/1963 | Malone .............................. 29/418 X |

*Primary Examiner*—Charlie T. Moon
*Attorney, Agent, or Firm*—Barlow & Barlow

[57] ABSTRACT

A front hinge having a base and an integral pair of spaced completely formed barrels extending from one face thereof with the opposite face of the base secured to the temple end portion of an eyeglass frame front whose rim is molded in a closed loop. Next a cutting tool is used to cut completely through the base of the front hinge and through the wall of the rim of the front at the temple end portion. The rim may then be spread apart a sufficient amount in order to insert a lens. To secure the lens in place, a screw is inserted through a pair of aligned apertures previously formed in said spaced barrels and the two halves of the front hinge are screw tightened together.

2 Claims, 5 Drawing Figures

METHOD OF SECURING A FRONT HINGE TO AN EYEGLASS FRAME FRONT

CROSS REFERENCE TO RELATED APPLICATION

This application is a division of application Ser. No. 375,385 filed July 2, 1973, which in turn is a continuation-in-part of application Ser. No. 171,679, filed Aug. 13, 1971, now abandoned.

BACKGROUND OF THE INVENTION

The invention relates to a novel front hinge and a method for securing it to an eyeglass frame whose rim is molded in a closed loop. In the past eyeglass frames have had their rims formed in a split rim configuration. This has necessitated the two parts of a two-part hinge each separately handled and each of which had to be attached to one of the open ends of the loop for securing a front hinge for a temple in place. These attaching mechanisms have been relatively complicated and each has proved to be quite time consuming in its assembly operation. Among the problems was that of alignment which was attempted to be solved by soldering a block to a metal frame and then building on to that block a partly formed hinge joint and drilling the block. Then splitting the rim block, and hinge joint and after splitting handling the lens rim and hinge joint to mill the hinge joint, and drill the two hinge parts possibly threading one of them for a hinge pin as set forth as prior procedure in U.S. Pat. No. 265,916, Oct. 10, 1882. Although this patent solders two parts of the hinge joint to a split rim, an alignment problem was attempted to be solved. Also recent developments in spectacle design have produced rims which are of odd or unusual configurations to which previous temple hinge mechanisms have not been adaptable. The use of different metals such as aluminum in making spectacle frames whose rim is molded in a closed loop has created a problem as to how to attach the front hinge to the rim in a quick and economical manner. One of the peculiar problems resulting from the use of molded aluminum frames is the fact that non aluminum front hinges cannot be soldered or welded to aluminum. Another problem has been how to insert the lens within the closed loop metallic rim after it has been molded. These and other problems have been solved by applicants' novel front hinge and method for assembly thereof to a closed loop metallic spectacle rim.

SUMMARY OF THE INVENTION

The operation of applicants' novel method of securing the front hinge to an eyeglass frame whose rim is molded in a closed loop is dependent upon his novel front hinge. The front hinge, which may have two, three or four barrels, is completely formed and machined with a base having one barrel with a slot therebetween or an adjacent pair of integral spaced barrels extending from one face thereof forming a slot therebetween, the base providing fastening means to the front. A first pair of aligned holes are formed in said barrels adjacent their tips for receiving a hinge pin that would secure a temple to the front hinge. A second pair of aligned holes are formed inwardly of the first in the barrels and one is threaded. The front hinge may be secured to the eyeglass frame by drilling a pair of vertically spaced holes through the temple portion of the frame and aligning the one-piece temple hinge with its pair of spaced holes in its base so as to register with the spaced holes drilled in the temple portion of the rim. The front hinge is then secured to the rim by inserting fastening members such as rivets, screws, et cetera, through the two sets of aligned holes. Alternately a pair of extruded rivets may extend from the rear face of the frame front to serve as the fastening means. Next a cutting tool is used to cut completely through the wall of the section of the rim to which the base is secured and then through the base of the front hinge separating the barrels. A lens may then be inserted within the rim aperture by spreading the now split loop rim. Then a screw would be inserted through a second pair of aligned holes formed in said barrels intermediate the first pair of holes and said base. One of these apertures is internally threaded whereby after the front hinge has been cut in half, the screw inserted therein can be tightened to secure the two halves of the front hinge together.

In certain applications where the metal of the molded rim and the metal of the front hinge are compatible, the front hinge may be welded or soldered to the temple end portion of the rim. Thereafter the same procedure would be followed for cutting a slot through the rim in order to insert the lens.

It is an object of the invention to provide a novel and economical method of securing a front hinge to the temple end portion of an eyeglass frame whose rim is molded in a closed loop and then preparing the frame for insertion of a lens in the rim.

It is also an object of the invention to provide a novel front hinge and method of attaching it to a metallic eyeglass frame whose rim is molded in a closed loop.

A further object of the invention is to provide a novel method of utilizing metallic eyeglass frames which have rims that have been molded in a closed loop by securing a novel front hinge thereto which may then be cut in half in order to allow for insertion of a lens in the rim.

DESCRIPTION OF THE PREFERRED EMBODIMENT

Figure 1:
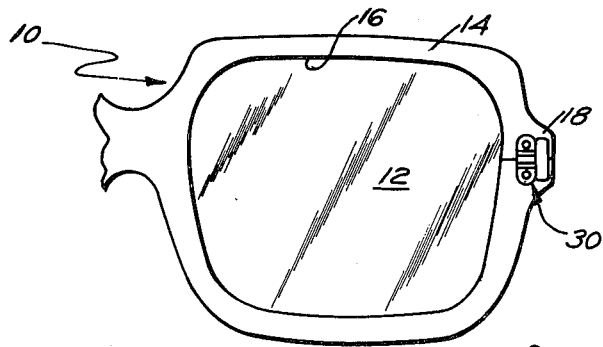
FIG. 1 is a partial rear elevation view of an eyeglass frame illustrating applicants' novel front hinge secured thereto and having the lens already inserted.
Figure 2:
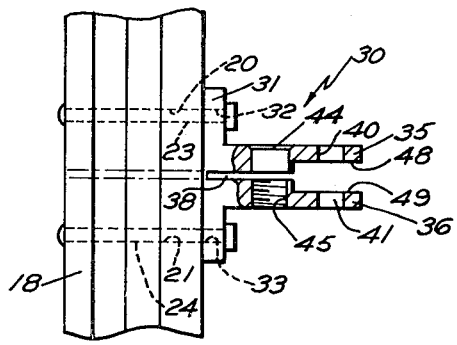
FIG. 2 is a partial end view illustrating the front hinge secured to an eyeglass frame prior to the cutting of a slit through the rim.

Referring to FIG. 1 a partial rear elevation view shows an eyeglass frame, generally designated numeral 10, having a lens 12 already inserted therein. The eyeglass frame was initially molded from a metallic material such as aluminum with its rim 14 being formed in a closed loop which defines a lens aperture 16. After the blank frame had been formed a front hinge 30 for a temple such as seen in FIG. 2 was secured to the temple end portion 18 of the frame front. Normally this is done by drilling a pair of spaced holes 20 and 21 through the temple end portion of the eyeglass frame front. Next the pair of spaced holes 32 and 33 in the base of the temple hinge 30 are aligned with the vertically spaced holes 20 and 21 in the rim. Fastening means such as rivets 23 and 24 are then inserted through the two sets of aligned holes and the temple hinge base is secured to the eyeglass rim.

Figure 4:
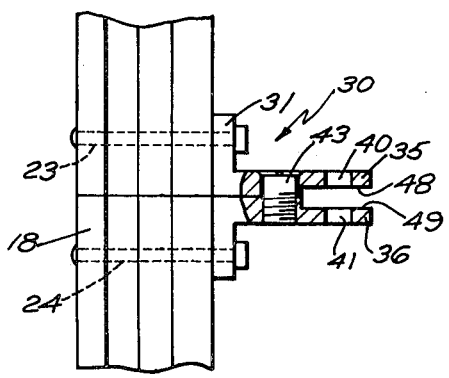
FIG. 4 is a partial end view illustrating how the front hinge would appear after a slit had been cut completely therethrough.

The front hinge itself as seen in FIGS. 2 and 4 as one piece of material has a base 31 having an integral pair of spaced barrels 35 and 36 extending at right angles from one side of the base and form a slot 38 therebetween. The barrels have a first pair of aligned holes 40 and 41 formed therein adjacent their tips for receiving a hinge pin. A second pair of aligned holes 44 and 45 are formed in said barrels intermediate the first pair of holes and the base. Hole 44 is countersunk at its top and hole 45 is internally threaded so that after the base has been cut in half, a screw may be inserted into this second pair of aligned holes to bring the two barrels together such as seen in FIG. 4 contracting the rim 14 about a lens. The barrels also have relieved sections 48 and 49 forming a slot therebetween so that they may receive a barrel therebetween from a mating hinge structure on a temple, the distance between the sections being larger by the width of slot 38 than the width of a barrel.

Figure 3:
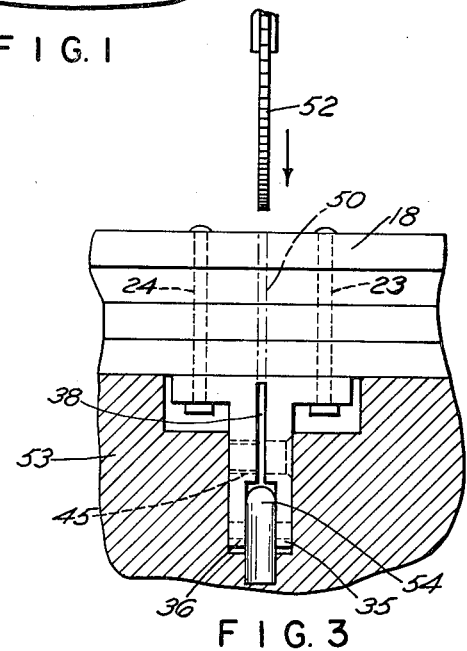
FIG. 3 is an edge view partly in section illustrating the front hinge secured to the rim of an eyeglass frame and held in a jig showing how a saw blade would cut therethrough.

FIG. 3 illustrates in dotted line 50 the path a saw blade 52 would take through the wall of the rim and the front hinge. The frame front is placed on a jig 53 with the enlarged portion of slot 38 at the relieved sections being received on a protruding plate 54. In this fashion the cut hinge and rim are prevented from springing together until the saw is removed. After the slot has been cut completely through the rim and the base of the hinge, a lens would be inserted within the now split loop of the rim.

Figure 5:
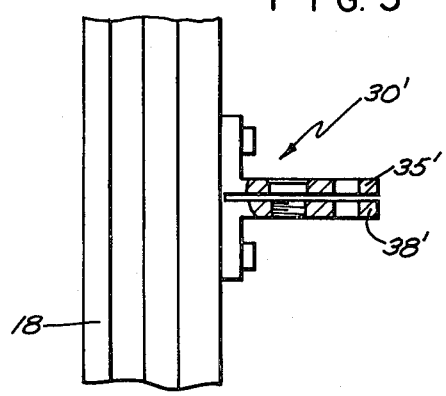
FIG. 5 is a partial end view illustrating an alternative front hinge and means for securing it to the rim.

An alternative embodiment is illustrated in FIG. 5 showing a front hinge 30' which may be welded or soldered or riveted to the temple end portion 18 of the frame front. The structure of the front hinge 30' shown without any relieved sections between the two barrels 35' and 38' but would otherwise function in the same manner as the front hinge 30 except that it would be adaptable to a different type of three barrel hinge structure. In cutting the frame and front hinge, the plate 54 would be of thinner section but in other respects, the cutting steps would be identical.

What is claimed is:

1. The method of securing a front hinge to an eyeglass frame front comprising:
    a. forming a front hinge having a base and at least an integral pair of spaced barrels extending upwardly therefrom defining a slot therebetween,
    b. securing the front hinge base to the temple end portion of an eyeglass frame whose rim is molded in a closed loop,
    c. aligning the center of the slot between the barrels with a cutting means,
    d. and then cutting a slit completely through the wall of the vertical section of the rim in line with the slot between the spaced barrels and then through the base of the front hinge.

2. The method of securing a front hinge to an eyeglass frame front as in claim 1 wherein the front hinge base is secured to the frame by:
    a. drilling a pair of vertically spaced holes through the temple end portion of an eyeglass frame front whose rim is molded in a closed loop,
    b. aligning a pair of spaced holes in the base of said front hinge with the vertically spaced holes drilled in the temple end portion of the rim,
    c. inserting fastening members through the two sets of aligned holes and securing the front hinge base to the eyeglass rim.

* * * * *